(12) United States Patent
Chen

(10) Patent No.: US 9,092,106 B2
(45) Date of Patent: Jul. 28, 2015

(54) TOUCH PANEL

(71) Applicant: HengHao Technology Co. LTD, Taoyuan County (TW)

(72) Inventor: Chi-An Chen, Taipei (TW)

(73) Assignee: HengHao Technology Co. Ltd., Taoyuan County (TW)

( * ) Notice: Subject to any disclaimer, the term of this patent is extended or adjusted under 35 U.S.C. 154(b) by 63 days.

(21) Appl. No.: 14/094,658

(22) Filed: Dec. 2, 2013

(65) Prior Publication Data

US 2015/0042900 A1    Feb. 12, 2015

(30) Foreign Application Priority Data

Aug. 7, 2013  (TW) ............... 102128387 A

(51) Int. Cl.
  *G06F 3/041*  (2006.01)
  *G06F 3/044*  (2006.01)
(52) U.S. Cl.
  CPC ...... *G06F 3/044* (2013.01); *G06F 2203/04111* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 8,581,123 | B2 * | 11/2013 | Ozeki et al. ............... | 178/18.06 |
| 2005/0258354 | A1 * | 11/2005 | Baba et al. ............... | 250/281 |
| 2011/0227858 | A1 * | 9/2011 | An et al. ............... | 345/174 |
| 2013/0342468 | A1 * | 12/2013 | Hekstra ............... | 345/173 |
| 2014/0110239 | A1 * | 4/2014 | Lee et al. ............... | 200/600 |
| 2014/0204048 | A1 * | 7/2014 | Lai et al. ............... | 345/174 |

FOREIGN PATENT DOCUMENTS

| | | |
|---|---|---|
| JP | 2010020749 A | 1/2010 |
| KR | 20120116281 A | 10/2012 |
| TW | 200915159 A | 4/2009 |

OTHER PUBLICATIONS

Office Action Dated Oct. 13, 2014 in corresponding Korean Patent Application No. 20-2013-0007707.

* cited by examiner

*Primary Examiner* — Van Chow
(74) *Attorney, Agent, or Firm* — Donald E. Stout; Stout, Uxa & Buyan, LLP

(57) ABSTRACT

A touch panel includes a first electrode layer and a second electrode layer disposed above a transparent substrate. At least one transparent insulating layer is disposed between the first electrode layer and the second electrode layer. The electrode pattern of the first electrode layer has more than four sides, and the electrode pattern of the second electrode layer substantially complements the electrode pattern of the first electrode layer. A gap between the first electrodes and the second electrodes is between 30 and 300 micrometers. A cover layer is formed above the second electrode layer, and magnetic force lines, generated from the first electrode and the second electrode, exist in the cover layer or pass through the cover layer.

19 Claims, 4 Drawing Sheets

| | |
|---|---|
| Y-axis electrode layer | ~130 |
| transparent insulating layer | ~120 |
| X-axis electrode layer | ~110 |

| | |
|---|---|
| cover layer | ~24 |
| second electrode layer | ~23 |
| transparent insulating layer | ~22 |
| first electrode layer | ~21 |
| substrate | ~20 |

TOUCH PANEL

BACKGROUND OF THE INVENTION

1. Field of the Invention

The present invention generally relates to a touch panel, and more particularly to a touch panel with a specific electrode pattern.

2. Description of Related Art

Touch screens adopting sensing technology and display technology have been widely employed in the capacity of providing input/output functionality to electronic devices such as portable or hand-held electronic devices.

A capacitor-based touch panel is a commonly used touch panel that utilizes a capacitive coupling effect to detect touch position. Specifically, changes in capacitance corresponding to the touch position are detected when a finger touches a surface of the touch panel.

Referring to FIGS. 1 and 2, the former shows a top view of a conventional touch panel 100, and the latter shows a stacking structure of the touch panel 100 of FIG. 1. The touch panel 100 primarily includes an X-axis electrode layer 110 and a Y-axis electrode layer 130, with the electrodes of the X-axis electrode layer 110 and the Y-axis electrode layer 130 having a rhombus shape. A transparent insulating layer 120, which is disposed between the X-axis electrode layer 110 and the Y-axis electrode layer 130, is used to insulate the X-axis electrode layer 110 from the Y-axis electrode layer 130. Typically, the transparent insulating layer 120 based on the conventional manufacturing process has a thickness ranging from 100 micrometers to 200 micrometers.

However, when the thickness of the transparent insulating layer 120 is minimized for reducing the overall thickness of the touch panel 100 or applying to the large-size widescreen touch panel, the X-axis electrode layer 110 and Y-axis electrode layer 130, having the rhombus-shaped electrodes, would suffer high resistivity. Moreover, trace phenomenon may also occur to impact visual appearance when users look at the touch panel 100. Further, the conventional touch panel 100 lacks a sufficient amount of touch sensing for the reason that the amount of touch sensing is provided only by electrode boundary regions 140 between the X-axis electrode layer 110 and the Y-axis electrode layer 130.

A need has thus arisen to propose a novel touch panel to overcome deficiencies of the conventional touch panels.

SUMMARY OF THE INVENTION

In view of the foregoing, it is an object of the embodiment of the present invention to provide a touch panel that can improve one or more of trace phenomenon, resistivity in the context of large-size widescreen touch panels, and touch sensing.

According to one embodiment, a touch panel includes a transparent substrate, a first electrode layer, at least one transparent insulating layer, a second electrode layer and a cover layer. The first electrode layer is disposed above the transparent substrate. The first electrode layer includes a plurality of first electrode lines that are disposed in parallel, each of the first electrode lines including a plurality of first electrodes that are connected in series via first interconnect elements. The at least one transparent insulating layer is disposed above the first electrode layer. The second electrode layer is disposed above the transparent insulating layer. The second electrode layer includes a plurality of second electrode lines that are disposed in parallel, each of second electrode lines including a plurality of second electrodes that are connected in series via second interconnect elements. Moreover, a gap between the first electrodes and the second electrodes is between 30 micrometers and 300 micrometers. The cover layer is disposed above the second electrode layer. The first electrodes have a shape having more than four sides, and the second electrodes have a shape that substantially complements the shape of the first electrodes. Further, the magnetic force lines, which are generated from the first electrodes and the second electrodes, exist in the cover layer or pass through the cover layer.

DETAILED DESCRIPTION OF THE INVENTION

Figures 3, 4:
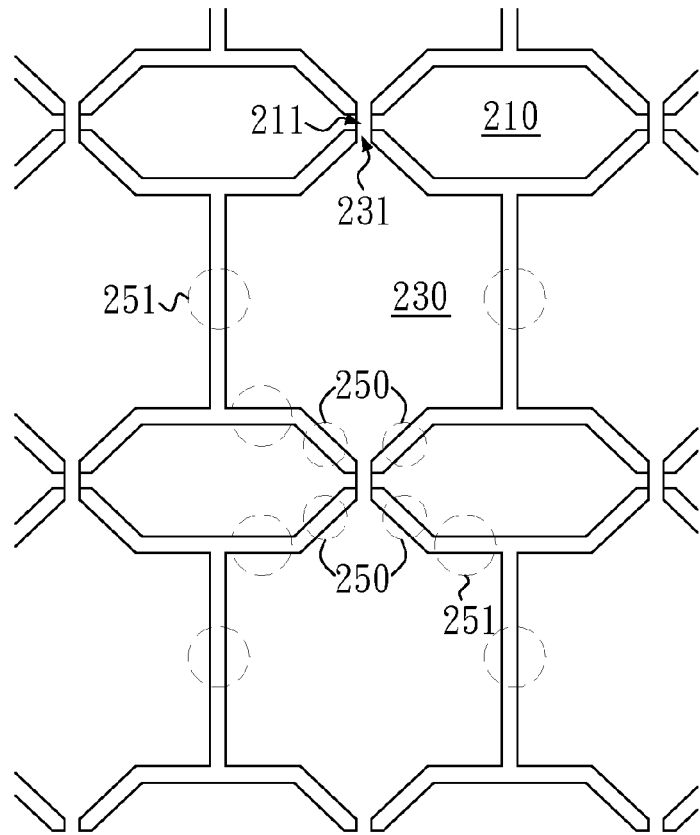
FIG. 3 shows a top view of a touch panel according to one embodiment of the present invention.
FIG. 4 shows a stacking structure of the touch panel of FIG. 3.

With particular reference to an exemplary implementation of the invention, FIG. 3 shows a top view of a touch panel 200 according to one embodiment of the present invention, and FIG. 4 shows a stacking structure of the touch panel 200 of FIG. 3. The embodiment may be preferably, but not necessarily, adapted to a widescreen touch panel.

As shown in FIGS. 3 and 4, the touch panel 200 includes a transparent substrate 20, a first electrode layer 21, at least one transparent insulating layer 22, a second electrode layer 23 and a cover layer 24. The first electrode layer 21 is formed on the transparent substrate 20. The first electrode layer 21 includes first electrode lines disposed in parallel. Each first electrode line comprises first electrodes 210, which are connected in series via first interconnect elements 211. The transparent insulating layer 22 is disposed above the first electrode layer 21. The second electrode layer 23 is formed on the transparent insulating layer 22, and the second electrode layer 23 includes second electrode lines disposed in parallel. Each second electrode line comprises second electrodes 230, which are connected in series via second interconnect elements 231. A gap between the first electrodes 210 and the second electrodes 230 is between 30 micrometers and 300 micrometers. The cover layer 24 is disposed above the second electrode layer 23. The first electrodes 210 have a shape having more than four sides, and the second electrodes 230 have a shape that substantially complements the shape of the first electrodes 210. Further, the magnetic force lines, which are generated from the first electrodes 210 and the second electrodes 230, exist in the cover layer 24 or pass through the cover layer 24.

More particularly, the transparent insulating layer 22 is disposed between the first electrode layer 21 and the second electrode layer 23. The transparent insulating layer 22 has a thickness ranging from 5 micrometers to 30 micrometers, which may greatly reduce the overall thickness of the touch panel 200, so as to achieve a thin and lightweight design.

The transparent substrate 20 may include insulating material such as glass, Polycarbonate (PC), Polyethylene terephthalate (PET), Polyethylene (PE), Poly vinyl chloride (PVC), Poly propylene (PP), Poly styrene (PS), Polymethyl methacrylate (PMMA) or Cyclic olefin copolymer (COC).

Furthermore, the cover layer 24 is formed above the second electrode layer 23. The cover layer 24 may include insulating material with high transmittance such as glass, Polycarbonate (PC), Polyethylene terephthalate (PET), Polymethyl methacrylate (PMMA) or Cyclic olefin copolymer (COC).

Figures 1, 2:
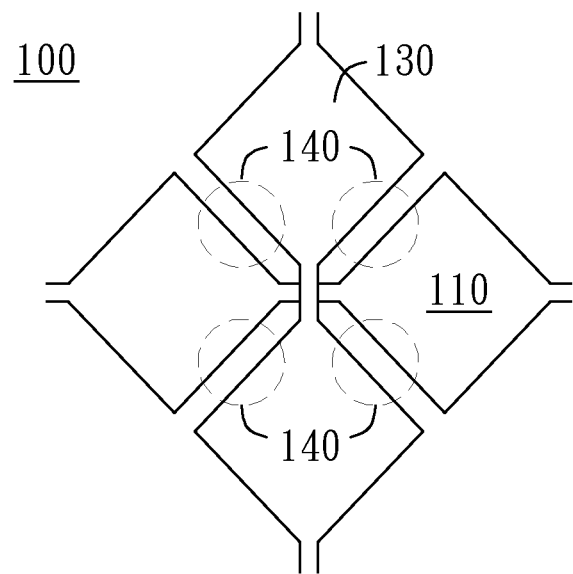
FIG. 1 shows a top view of a conventional touch panel.
FIG. 2 shows a stacking structure of the touch panel of FIG. 1.

Moreover, the first electrode layer 21 includes first electrode lines disposed in parallel, for example, as transmit electrodes (Tx). Each first electrode line, disposed along a first direction, comprises first electrodes 210 connected in series via first interconnect elements 211. In the embodiment, the first electrodes 210 have a six-sided (or hexagon) shape, instead of the rhombus shape of the conventional touch panel (e.g., shown in FIG. 1).

The second electrode layer 23 is formed above the first electrode layer 21. At least one transparent insulating layer 22, disposed between the second electrode layer 23 and the first electrode layer 21, is used to electrically insulate the second electrode layer 23 from the first electrode layer 21 and to bond the second electrode layer 23 with the first electrode layer 21.

Furthermore, the second electrode layer 23 includes a plurality of second electrode lines disposed in parallel, for example, as receive electrodes (Rx). Each second electrode line, disposed along a second direction, comprises second electrodes 230, which are connected in series via second interconnect elements 231. The first direction and the second direction mentioned above may, but not necessarily, be substantially perpendicular with each other. In the embodiment, the second electrodes 230 (having a ten-sided shape as exemplified in FIG. 3) have a shape that substantially complements the six-sided shape of the first electrodes 210, instead of the rhombus shape in the conventional touch panel (e.g., shown in FIG. 1). The complementary first electrodes 210 and the second electrodes 230 substantially cover a top active surface of the touch panel 200. In one embodiment, a gap between the first electrodes 210 and the second electrodes 230 is between 30 micrometers and 300 micrometers. Thus, the touch sensing of the touch panel 200 may be greatly enhanced by a proper selection of the gap between the first electrodes 210 and the second electrodes 230, according to the actual design and the manufacturing need. In a more preferred embodiment, the gap between the first electrodes 210 and the second electrodes 230 is between 30 micrometers and 100 micrometers. In another embodiment, the gap between the first electrodes 210 and the second electrodes 230 is between 100 micrometers and 300 micrometers.

As the first electrodes 210 and the second electrodes 230 make a good combination with small gaps, trace phenomenon may thus be greatly improved. The resistivity of a large-size widescreen touch panel adopting the electrodes discussed above may be substantially reduced. In the meantime, the intensity of magnetic force lines generated from the first electrodes 210 and the second electrode 230 can be increased by utilizing the electrodes discussed above and selecting the proper gap for the electrodes, such that the magnetic force lines may exist evenly in the cover layer 24 or pass through the cover layer 24. More specifically, the amount of touch sensing may be greatly enhanced by utilizing the electrodes discussed above due to increased neighboring regions 251 between the first electrodes 210 and the second electrodes 230, therefore enhancing touch performance.

As exemplified in FIG. 3, the amount of touch sensing is provided not only by electrode boundary regions 250 between the first electrodes 210 and the second electrodes 230, but also by the neighboring regions 251 between the first electrodes 210 and the second electrodes 230. Therefore, the intensity of magnetic force lines generated from the touch panel 200 can be increased for the floating touch application, so that the touch panel 200 may detect a sensing position on the cover layer corresponding to a floating touch (non-real touch) or detect an actual touch position on the touch panel 200. The cover layer 24 of the touch panel 200 may have a thickness being equal to or less than 5 centimeters.

Figure 5:
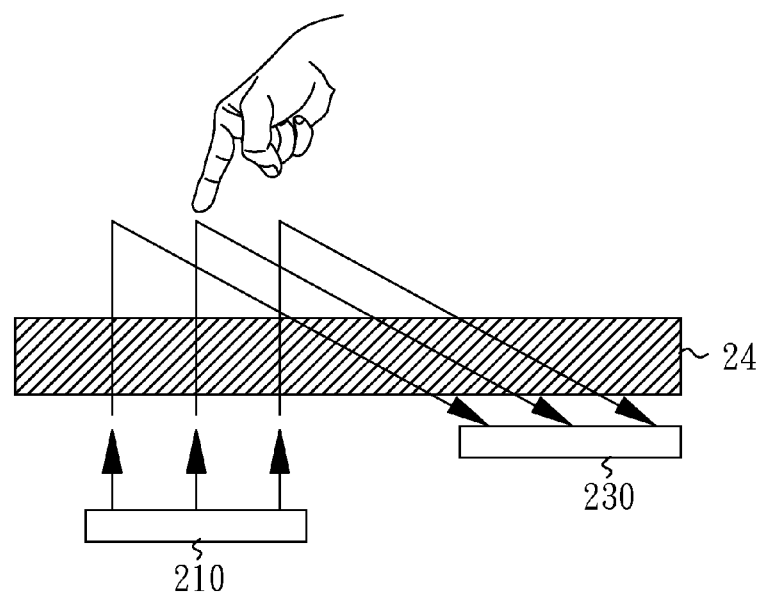
FIG. 5 shows an example of a floating touch on the touch panel according to one embodiment of the present invention.

Referring to FIG. 5, an example of a floating touch of the touch panel 200 is shown. By utilizing the first electrodes 210 and the second electrodes 230 and selecting the proper gap for the electrodes discussed above, the intensity of the magnetic force lines generated from the first electrodes 210 and the second electrodes 230 can be increased, and the corresponding sensing field may extend through the cover layer 24. Accordingly, when the user operates the touch panel 200, the user is allowed to operate the touch panel 200 by hovering the finger over the cover layer 24, in order to transmit the operating signal without an actual touching contact on the touch panel 200.

In one embodiment, the first electrode layer 21 and the second electrode layer 23 may include a light-transmissive structure made of a non-transparent material. The non-transparent material may include metal nanowires (e.g., silver nanowires or copper nanowires) or metal nanonets (e.g., silver nanonets or copper nanonets). The metal nanowires or nanonets have a diameter in a nanometer order (i.e., a few nanometers to hundreds nanometers), and may be fixed via a plastic material (e.g., resin). Due to fineness of the metal nanowires/nanonets unobservable to human eyes, the first electrode layer 21 and the second electrode layer 23 made of the metal nanowires/nanonets thus have high light-transmittance. In another embodiment, the first electrode layer 21 and the second electrode layer 23 may further include a photosensitive material (e.g., acrylic), through which electrodes 210/230 with a required pattern may be formed via an exposure development process.

In another embodiment, one of the first electrode layer 21 and the second electrode layer 23 may include a light-transmissive structure made of a transparent material. The transparent material may include indium tin oxide (ITO), indium zinc oxide (IZO), Al-doped ZnO (AZO) or antimony tin oxide (ATO).

More than one transparent insulating layer 22 may be utilized. The transparent insulating layer 22 may include an anti-split film (ASF), an optical clear adhesive (OCA) or other insulating layers with specific functions. Moreover, the first electrode layer 21 or the second electrode layer 23 including the non-transparent material (e.g., metal nanowires) may further include an insulating layer disposed on its top surface or bottom surface when required.

Figure 6:
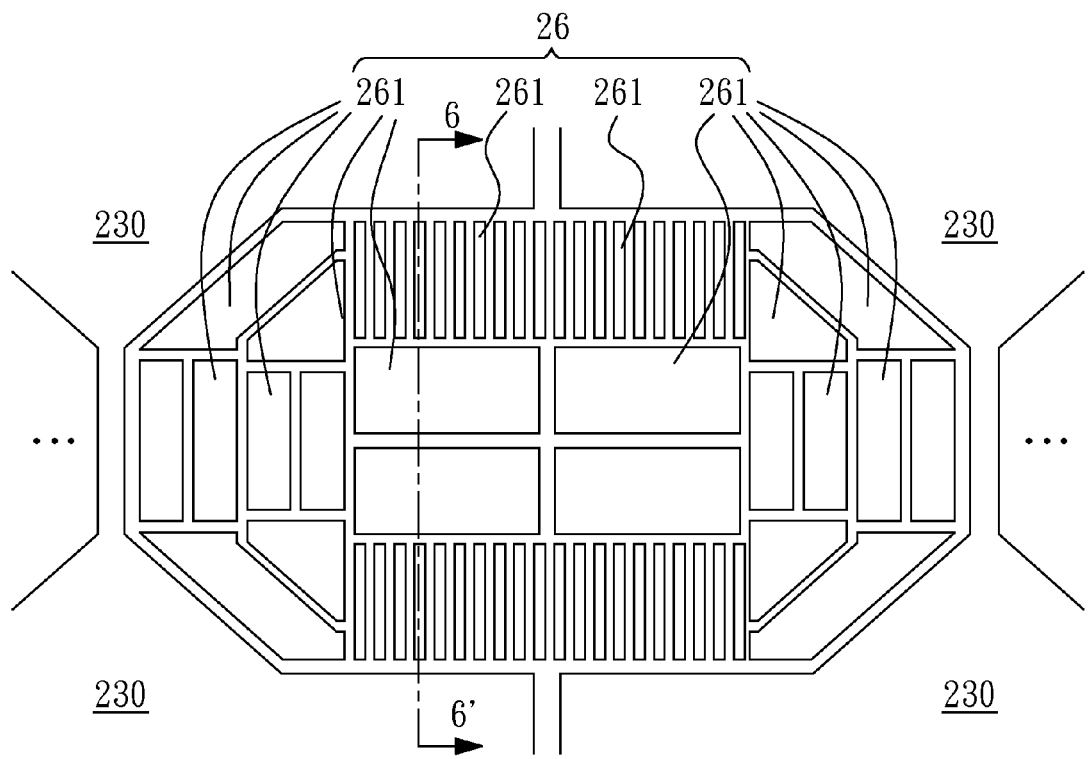
FIG. 6 shows a top view of a touch panel according to another embodiment of the present invention.
Figure 7:
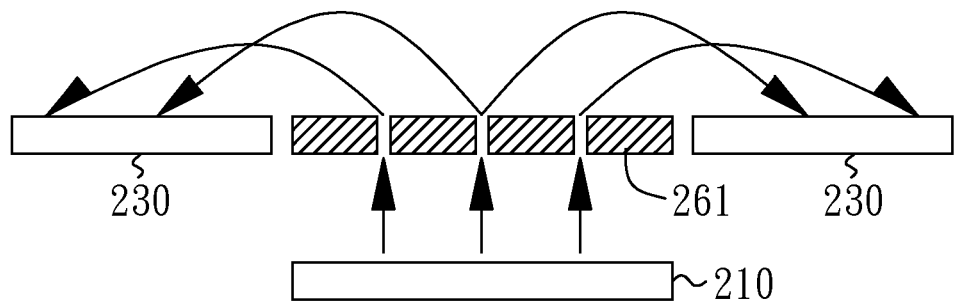
FIG. 7 shows a cross-section view taken along the line 6-6' in FIG. 6.

Referring to FIGS. 6 and 7, shown respectively are a top view of a touch panel 200 according to another embodiment of the present invention and a cross-section view taken along the line 6-6' of FIG. 6. The touch panel 200 further includes a plurality of insulating blocks 26. The insulating blocks 26 are disposed above first electrodes 210 and adjacent to the second electrodes 230. The insulating blocks 26 are used to electrically insulate the first electrodes 210 from the second electrodes 230. Moreover, each insulating block 26 further includes a plurality of subinsulating blocks 261, and a gap between the insulating blocks 261 is less than 30 micrometers. However, a shape of each subinsulating block 261 may be adjusted according to actual requirements, such as triangular, rectangular, any polygonal shape, circular, elliptical, annular or any combination thereof. Therefore, due to the configuration and the arrangement of the subinsulating blocks 261, it may not only provide an optimal light path between the first electrode layer 21 and the second electrode layer 23, but also increase the efficiency of the optical coefficient and decrease the legibility of patterns of the first electrodes 210 and the second electrodes 230, so as to enhance the overall displaying effect of the touch panel 200. Simultaneously, the gap between the subinsulating blocks 261 may also provide a path for the magnetic force lines generated from the first electrode layer 21 to pass through, such that the touch sensing of the touch panel 200 may be greatly increased.

In one embodiment, the insulating block 26 may include a light-transmissive structure made of a non-transparent material. The non-transparent material may include metal nanowires (e.g., silver nanowires or copper nanowires) or metal nanonets (e.g., silver nanonets or copper nanonets). The metal nanowires or nanonets have a diameter in a nanometer order (i.e., a few nanometers to hundreds nanometers), and may be fixed via a plastic material (e.g., resin). Due to fineness of the metal nanowires/nanonets unobservable to human eyes, the insulating blocks 26 made of the metal nanowires/nanonets thus have high light-transmittance. In another embodiment, the insulating blocks 26 may further include a photosensitive material (e.g., acrylic), through which the insulating blocks 26 and the subinsulating block 261 with a required pattern may be formed via an exposure development process.

In another embodiment, the insulating block 26 may include a light-transmissive structure made of a transparent material. The transparent material may include indium tin oxide (ITO), indium zinc oxide (IZO), Al-doped ZnO (AZO) or antimony tin oxide (ATO).

Although specific embodiments have been illustrated and described, it will be appreciated by those skilled in the art that various modifications may be made without departing from the scope of the present invention, which is intended to be limited solely by the appended claims.

What is claimed is:

1. A touch panel, comprising:
   a transparent substrate;
   a first electrode layer disposed above the transparent substrate, the first electrode layer including a plurality of first electrode lines that are disposed in parallel, each of the first electrode lines including a plurality of first electrodes that are connected in series via first interconnect elements;
   at least one transparent insulating layer disposed above the first electrode layer;
   a second electrode layer disposed above the at least one transparent insulating layer, the second electrode layer including a plurality of second electrode lines that are disposed in parallel, each of the second electrode lines including a plurality of second electrodes that are connected in series via second interconnect elements, wherein a gap between the first electrodes and the second electrode is between 30 micrometers and 300 micrometers; and
   a cover layer disposed above the second electrode layer;
   wherein the first electrodes have a shape having more than four sides, and the second electrodes have a shape that substantially complements the shape of the first electrodes, and magnetic force lines, generated from the first electrodes and the second electrode lines, exist in the cover layer or pass through the cover layer.

2. The touch panel of claim 1, wherein the transparent insulating layer has a thickness ranging from 5 micrometers to and 30 micrometers.

3. The touch panel of claim 1, wherein the transparent substrate comprises glass, Polycarbonate (PC), Polyethylene terephthalate (PET), Polyethylene (PE), Poly vinyl chloride (PVC), Poly propylene (PP), Poly styrene (PS), Polymethyl methacrylate (PMMA) or Cyclic olefin copolymer (COC).

4. The touch panel of claim 1, wherein the first electrodes have a six-sided shape.

5. The touch panel of claim 1, wherein the first electrode layer or the second electrode layer comprises a light-transmissive structure made of a non-transparent material.

6. The touch panel of claim 5, wherein non-transparent material comprises metal nanowires or metal nanonets.

7. The touch panel of claim 5, further comprising an insulating layer disposed on a surface of the non-transparent material.

8. The touch panel of claim 5, wherein one of the first electrode layer and the second electrode layer comprises a light-transmissive structure made of a transparent material.

9. The touch panel of claim 8, wherein the transparent material comprises indium tin oxide (ITO), indium zinc oxide (IZO), Al-doped ZnO (AZO) or antimony tin oxide (ATO).

10. The touch panel of claim 1, wherein the transparent insulating layer comprises an anti-split film (ASF.

11. The touch panel of claim 1, wherein the magnetic force lines are used for detecting a sensing position on the cover layer corresponding to a floating touch or detecting an actual touch position on the touch panel, and the cover layer of the touch panel has a thickness being equal to or less than 5 centimeters.

12. The touch panel of claim 1, wherein the cover layer comprises glass, Polycarbonate (PC), Polyethylene terephthalate (PET), Polyethylene (PE), Poly vinyl chloride (PVC), Poly propylene (PP), Poly styrene (PS), Polymethyl methacrylate (PMMA) or Cyclic olefin copolymer (COC).

13. The touch panel of claim 1, further comprising a plurality of insulating blocks, wherein each insulating block is correspondingly disposed above the first electrodes and adjacent to the second electrode lines.

14. The touch panel of claim 13, wherein each insulating block further comprises a plurality of subinsulating blocks, and a gap between the subinsulating blocks is less than 30 micrometers.

15. The touch panel of claim 14, wherein each subinsulating block has a shape selected from the group consisting of: triangular, rectangular, any polygonal shape, circular, elliptical, annular or any combination thereof.

16. The touch panel of claim 13, wherein each insulating block comprises a light-transmissive structure made of a non-transparent material.

17. The touch panel of claim 16, wherein the non-transparent material comprises metal nanowires or metal nanonets.

18. The touch panel of claim 13, wherein each insulating block comprises a light-transmissive structure made of a transparent material.

19. The touch panel of claim 18, wherein the transparent material comprises indium tin oxide (ITO), indium zinc oxide (IZO), Al-doped ZnO (AZO) or antimony tin oxide (ATO).

* * * * *